United States Patent

Shelton

[15] 3,691,901
[45] Sept. 19, 1972

[54] TABLE MECHANISM FOR USE IN TRANSFERRING DIMENSIONAL AND SHAPE INFORMATION BETWEEN TWO AND THREE DIMENSIONAL OBJECTS

[72] Inventor: James D. Shelton, Bothell, Wash.
[73] Assignee: Ralph W. Krustsinger, Jr., Lynnewood, Wash.; a part interest
[22] Filed: Feb. 23, 1971
[21] Appl. No.: 117,964

Related U.S. Application Data

[62] Division of Ser. No. 875,706, Nov. 12, 1969, Pat. No. 3,593,615.

[52] U.S. Cl. ............... 90/13.1, 90/13 C, 318/577
[51] Int. Cl. ............................................. B23c 1/16
[58] Field of Search .......... 90/15, 13.1, 13.2, 13 C; 33/1 M, 23 C; 318/577; 178/6.6

[56] References Cited

UNITED STATES PATENTS

| | | |
|---|---|---|
| 3,241,243 | 3/1966 | Speer ..................... 33/1 M X |
| 2,508,468 | 5/1950 | Rathje, Jr. ............... 33/23 C X |
| 3,065,554 | 11/1962 | Colabella, Jr. .......... 90/13 C X |
| 2,305,167 | 12/1942 | Kasper ..................... 33/23 C |
| 3,293,651 | 12/1966 | Gerber et al. .......... 90/13 C X |
| 3,449,833 | 6/1969 | Dzula ........................ 33/1 M |
| 3,550,276 | 12/1970 | Kramer et al. ......... 33/23 C X |

*Primary Examiner*—Gil Weidenfeld
*Attorney*—Graybeal, Cole & Barnard

[57] ABSTRACT

A system of master-slave synchro-servo mechanism interconnects, for conjoint movement, a first stylus mounted for two dimensional movement across a paper or other flat surface, and a second stylus mounted for a corresponding two dimensional movement over a three dimensional object. The second stylus is adjustable in the third dimension, and both styluses may be rotatable and interconnected by master-slave synchro-servo mechanisms adapting them for conjoint rotation. The synchro-servo mechanisms are reversible so that each stylus can control the other.

7 Claims, 15 Drawing Figures

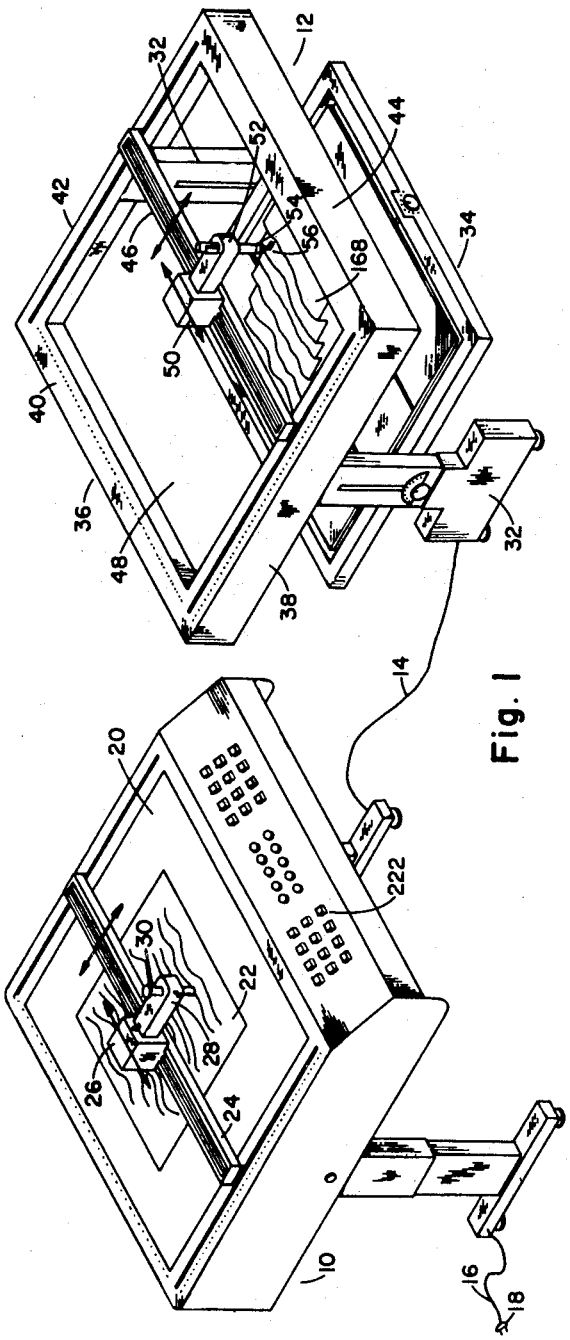

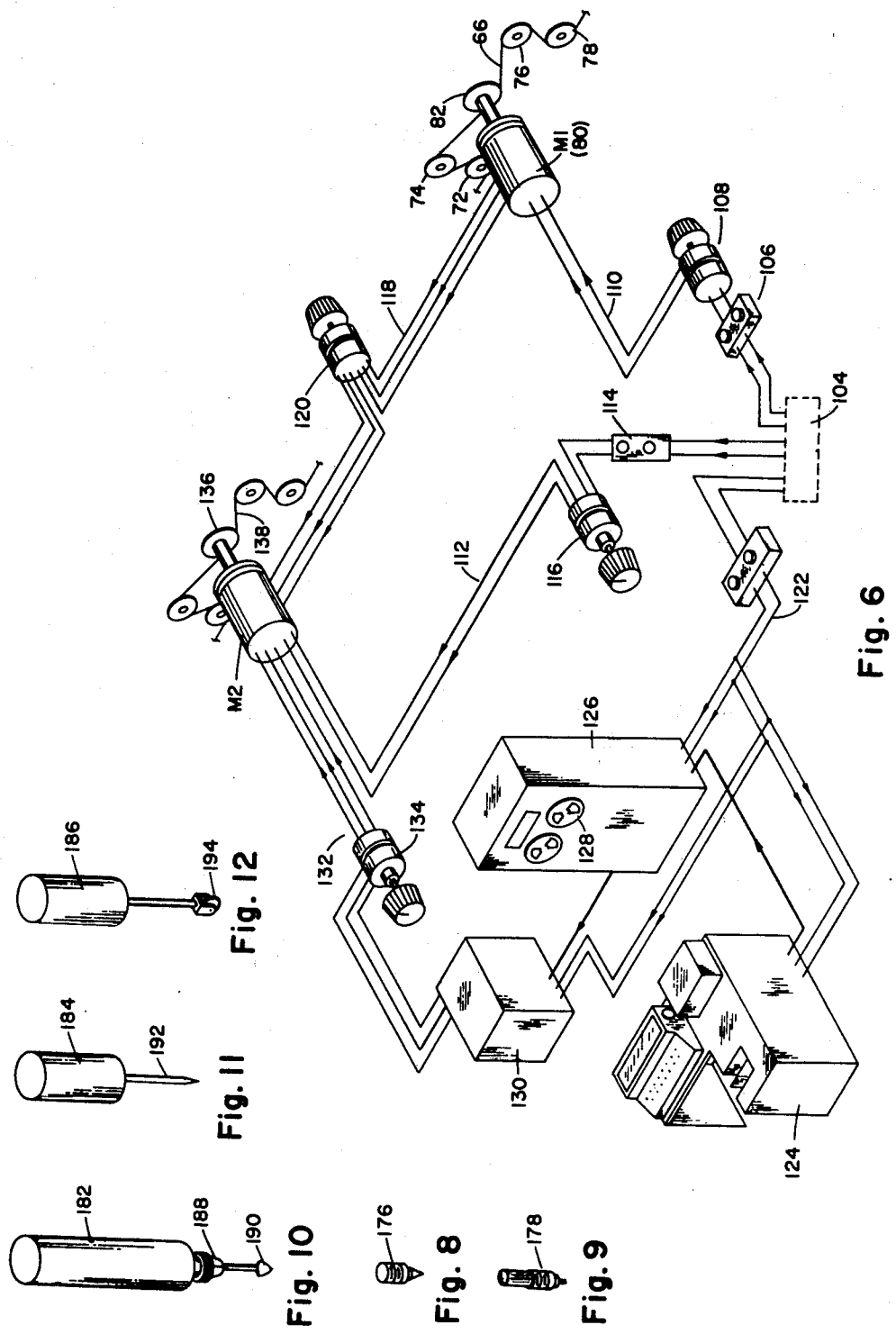

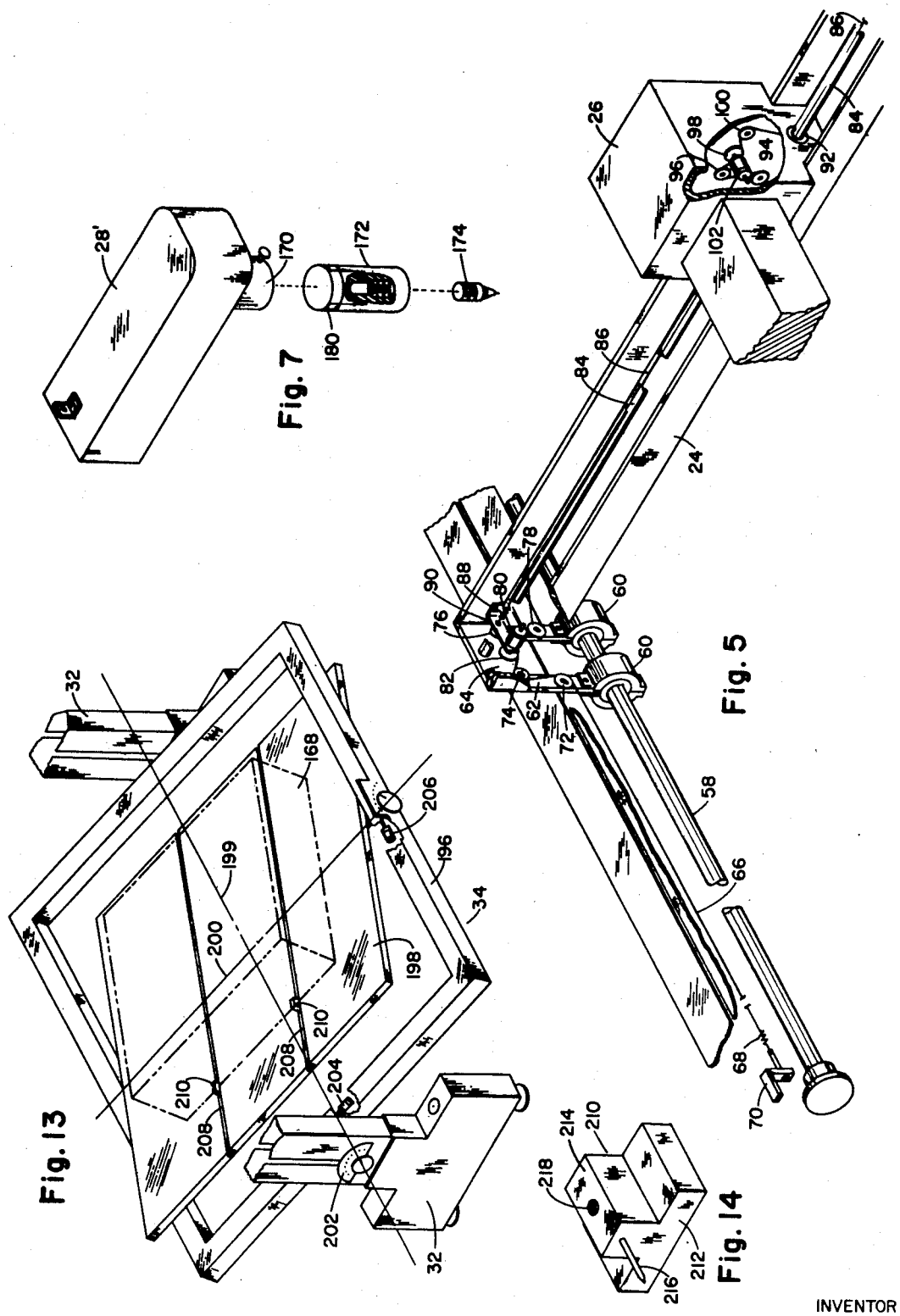
PATENTED SEP 19 1972
3,691,901
SHEET 3 OF 3
INVENTOR.
JAMES D. SHELTON
BY Graybeal, Cole & Barnard
ATTORNEYS

TABLE MECHANISM FOR USE IN TRANSFERRING DIMENSIONAL AND SHAPE INFORMATION BETWEEN TWO AND THREE DIMENSIONAL OBJECTS

CROSS-REFERENCE TO RELATED APPLICATION

This is a division of my copending application, Ser. No. 875,706, filed Nov. 12, 1969, now U.S. Pat. No. 3,593,615 and entitled Mechanism For Transferring Dimensional And Shape Information Between Two and Three Dimensional Objects.

BACKGROUND OF THE INVENTION

1. Field of the Invention

The present invention relates to a mechanism for transferring dimensional and shape information from one object to another, and in particular to such a mechanism for transferring dimensional and shape information from a two dimensional drawing or other two dimensional object to a three dimensional object, or for transmitting dimensional and shape information from a three dimensional object to a piece of paper or other two dimensional object, or for transferring dimensional and shape information between three dimensional objects.

2. Description of the Prior Art

The present invention arose from my efforts to develop an improved model making machine capable of with the aid of an operator taking dimensional and shape information off from a two dimensional topographical map and converting such information into an electrical signal usable for operating a milling tool for forming a solid block of styrofoam or the like into a three dimensional topographical model.

Prior art mechanisms known by me for this or a similar purpose are shown by Howey U.S. Pat. No. 1,923,208; Davis U.S. Pat. No. 2,702,496; Lange U.S. Pat. No. 2,976,636; Colabeella, Jr. U.S. Pat. No. 3,065,554; Green et al. U.S. Pat. No. 3,137,209; Weaver U.S. Pat. No. 3,156,155 and Jenkins U.S. Pat. No. 3,200,712.

The mechanism of the present invention is believed to have greater versatility than the mechanisms disclosed by these patents, and is believed to be relatively simple in construction and relatively easy to operate in comparison with the prior art mechanisms approaching it capabilities.

SUMMARY OF THE INVENTION

Basically, the mechanism of the present invention comprises a support panel for a drawing or a sheet of paper, a support frame for a block of model making material, or a model, a first stylus mounted for two dimensional movement over the drawing or paper, a second stylus mounted for two dimensional movement over the model material or model, means for adjusting the second stylus in position in a third dimension, and a system of master-slave synchro-servo mechanisms interconnecting the first stylus and the second stylus for conjoint two dimensional movement. Preferably, this system is reversible so that it can be used for both making a three dimensional model from information on a two dimensional drawing or map, and for the making of a map, drawing or diagram from a model or other three dimensional object.

A principal part of the present invention relates to the provision of a milling machine having an infinitely variable X-Y- Z-R milling tool. X and Y are the horizontal movements which operate within a single horizontal plane, the direction of their movements being ninety degrees (90°) divergent from each other. Movement Z is a vertical or zenith movement and movement R is rotational. The combination of these movements allows the mechanism to construct a three dimensional model from drawings, or with the appropriate soft wave from analogue or digital computers, or from movement digitizers, scanners, tracing scribes, etc. In preferred form all movements are accomplished by means of synchro-servo reversal mechanisms on a friction-rotational feed.

Capabilities and application of the mechanism of this invention are enumerable. For example, the mechanism may be used for model making in the architectural, agricultural, automotive, civil engineering, marine engineering and real estate sales fields; for the creation of electrical printed circuitry by engraving, and for the making of drawings from information extracted from various types of models.

The present invention also relates to specific table and console constructions, and to particular mechanisms for movably mounting the styluses of the input and output machines.

BRIEF DESCRIPTION OF THE DRAWING

FIG. 1 is an isometric view of an embodiment of the invention, comprising a drawing table or console and a model table or console having styluses interconnected for conjoint two dimensional movement;

FIG. 2 is an enlarged scale isometric view of a rotatable optical sight type stylus;

FIG. 3 is an isometric view of the optical target seen by the user of the optical stylus;

FIG. 4 is an isometric view of a vertically (or zenith direction) adjustable tool or stylus holder for the model table;

FIG. 4A is an isometric view of a rotatable resistance wire carving or milling tool of the type being used in the installation of FIG. 1;

FIG. 5 is a fragmentary isometric view of typical guide and drive mechanisms for the support bars and the tool holders;

FIG. 6 is an operational schematic diagram of the synchro-servo mechanisms used for connecting the support bars and the tool holders together for conjoint movement;

FIG. 7 is a perspective view of a pencil equipped tool usable at the drawing table in place of the optical follower, when using the drawing table for making a drawing from a model or other three dimensional object;

FIG. 8 is an isometric view of a scribing tool usable in the tool assembly of FIG. 7, in place of the pencil tool;

FIG. 9 is an isometric view of an inking pen or tool usable in the tool assembly of FIG. 7, in place of the pencil tool;

FIG. 10 is an isometric view of a routing tool usable in the milling tool assembly of FIG. 4 in place of the heating element tool;

FIG. 11 is an isometric view of a scribing tool usable in tool assembly of FIG. 4;

FIG. 12 is an isometric view of a tracing wheel tool usable in the tool assembly of FIG. 4;

FIG. 13 is an isometric view of the universally adjustable support for the three dimensional object; and FIG. 14 is an isometric view of one of several clamps provided for securing the three dimensional object to its support.

DETAILED DESCRIPTION

Referring now to FIG. 1, the illustrated embodiment of the present invention is shown to comprise a drawing table or console 10 and a model table or console 12. The consoles 10, 12 are interconnected by electrical circuitry, hereinafter to be described in greater detail, which includes an electrical cord 14 extending between the two consoles 10, 12. An electrical cord 16 equipped with a wall outlet plug 18 is provided for connecting the equipment to a source of A.C. electrical energy.

Table 10 is shown to comprise an upper support surface 20 for a map or other drawing 22, or for a piece of paper. Preferably, support surface 20 is an opaque panel (e.g., opaque plastic or frosted glass) and electric lighting (not shown) is provided below panel 20. An elongated support bar 24 extends across the panel 20 and is supported at each of its ends for back-and-forth sideways movement across the panel 20. A tool holder or carrier 26 is mounted for back-and-forth movement longitudinally of the support bar 24. A tool assembly 28 is connected to the carrier 26 and projects therefrom outwardly and over the map or drawing 22. In FIG. 1 the tool assembly 28 is shown to include an optical stylus 30. As will hereinafter be described in greater detail, the support bar 24 and the tool carrier 26 mount the stylus 30 for two dimensional linear movement over the map or drawing 22.

Console 12 is shown to comprise a pair of side supports 32, a model or model material support frame 34 and an interiorly open upper frame 36. The lower frame 34 is located between the side supports 32 at a level intermediate the height of the console 12. The upper frame 36 is interconnected between the tops of the side supports 32. Frame 36 comprises four side parts 38, 40, 42, 44 which are connected together by right angle corners.

A second elongated support bar 46 spans across the interior opening 48 and is mounted at its opposite ends for back-and-forth sideways travel across the opening 48. A second tool carrier 50 is mounted on bar 48 for back-and-forth longitudinal travel therealong. A second tool assembly is secured to carrier 50. In FIG. 1 the tool assembly 52 is shown to comprise a vertically adjustable tool holder 54 holding a resistance wire carving tool 56. Tool assembly 52 is shown in greater detail in FIG. 4 and tool element 56 is shown in greater detail in FIG. 4A.

Reference is now made to FIG. 5. FIG. 5 relates to support bar 24 and tool carrier 26. However, it shows a typical support and drive mechanism which is common to both of the bars 24, 46 and to both of the tool carriers 26, 50.

As shown by FIG. 5, an elongated guide rod 58 is provided at each end of the bar 24. The guide rods 58 extend parallel to each other and perpendicular to the bar 24. A pair of guide bearings 60 encircle each rod 58. A vertical end wall structure 62 is interconnected between each end portion 64 of the bar 24 and the adjacent pair of support bearings 60. An elongated cord 66 is supported in near parallelism with at least one of the guide rods 58. A coil spring 68 is shown interconnected between one end of the cord 66 and an end support 70, such spring 68 serving to maintain tension in the cord 66. The end structure 62, 64 of rod 24 supports a plurality of pulleys 72, 74, 76, 78. A small electric motor, or a servo mechanism operable as either a motor or a generator, is mounted at the end of bar 24. This motor 80 includes a pulley 82. The pulleys 72, 74, 76, 78 and 82 are small grooved wheels and they are all located in coplanar parallelism. The cord 66 extends form spring 68 to pulley 72, then up and around the underside of pulley 72, then over pulley 74, then down and under pulley 82, then up and over pulley 76 then down and around pulley 78, and then from pulley 78 along a path which is substantially colinear to the extent of cord 66 between spring 68 and the first pulley 72. As will be appreciated, a rotational drive of motor 80 will cause the pulley 82 to roll along the cord 66, resulting in sideways movement of the support bar 24. Also, manual sideways movement of bar 24 will cause the pulley 82 to roll along the cord 66.

Support bar 24 is of upwardly opening channel form, and to house an elongated guide rod 84 and a cord 86. A spring 88 is interconnected between an end of the cord 86 and an end support bracket 90. Tool carrier 26 includes guide bearing means 92 which surroundingly engages the guide rod 84. Inside of carrier 26 the cord 86 engages a series of pulleys 94, 96, 98, 100, all of which are in coplanar parallelism. Cord 86 first travels below pulley 94 then up and around pulley 96, then below pulley 98, then up and over pulley 100, and then down to a second pulley 94 (not shown). From the second pulley 94 it extends along a path which is substantially colinear with the path of cord 86 between pulley 94 and spring 88.

Pulley 98 is attached to the shaft of either a small electric motor 102 or a servo mechanism operable as either a motor or a generator. As in the case of motor 80 and pulley 82, rotation of motor 102 causes the pulley 98 to travel relatively along the cord 86. It is in this fashion that the carrier 26 is driven along the cord 86.

As heretofore mentioned, the drive mechanisms for the support bar 46 and the tool carrier 50 of model console 12 are preferably identical to the just described drive mechanisms for the support bar 24 and the tool carrier 26. In some installations an elongated rack may be substituted in place of the tensioned cords 66, 86, and small gear wheels substituted for the pulleys 82, 98.

The electric motors 80, 102 may be a part of an electrical circuit which includes one or a system of off-on switches for controlling these motors 80, 102. The motors 80, 102 may be controlled by an information storage and retrieval mechanism (i.e., a computer) per a programed set of instructions. Preferably, the motors 80, 102 are synchro-servo mechanisms, and each is one of a pair of reversible master-slave synchro-servo mechanisms, the other mechanisms of the pairs being associated with the support bar 46 and the carrier 50 of model console 12.

Referring now to FIG. 6, numeral 104 designates a source of alternating current. A first branch of the electrical circuit leads from source 104 through a switch 106 to a first rheostat 108 and from rheostat 108 to a first servo mechanism M1, which may be motor 80.

This branch 110 connects the power source 104 to the rotor of servo mechanism M1.

A second branch 112 of the circuit extends from source 104 through a switch 114 to a rheostat 116, and from rheostat 116 to the rotor of a second servo mechanism M2. This mechanism M2 is the counterpart for motor 80 in the control system for support bar 46, i.e., the electric motor which rides on the tension cord associated with support bar 46. The stators of the two servo mechanisms M1, M2 are interconnected by wiring 118 in which is located a rheostat 120. The rheostats 108, 116, 120 are provided as means for adjusting the scale of the dimensional information being transferred from one table to the next. In other words, these rheostats 108, 116, 120 provide a way of changing the speed ratio between the servo mechanisms M1, M2, so that a given amount of rotational movement by one mechanism M1, M2, will either cause a proportionally larger or a proportionally smaller amount of rotational movement of the other servo mechanism M1, M2.

A third branch 122 of the electrical circuitry serves for coupling an information storage and retrieval mechanism (i.e., a programed computer) into the system in place of the input servo mechanism M1. By way of typical and therefore nonlimitive example, the information storage and retrieval apparatus is shown to comprise a card punching machine 124, a mechanism 126 for transferring information from punched cards to a tape 128, and a mechanism 130 for converting the information on the tape to electrical off-on signals to be transmitted through circuitry 132 to the slave servo mechanism M2. This circuitry 132 is also shown to include a rheostat 134, provided for scale adjustment.

When the servo mechanisms M1, M2 are coupled together through branch 112 of the circuitry, mechanism M1 is the master and mechanism M2 is the slave. Movement of the support bar 24 by the operator causes a rotation of pulley 82. As pulley 82 rotates the servo mechanism M1 generates an electrical signal that is transmitted to the slave mechanism M2. Such signal causes a corresponding rotation of the mechanism M2, and hence a corresponding rotation of the pulley 136 attached to mechanism M2, and a corresponding travel of the support bar 46 by reason of the rotational travel of the pulley 136 along the cord 138. As earlier explained, the rheostats determine if the ratio of movement is 1 : 1 or is greater or lesser than 1 : 1.

Since synchro-servo mechanism technology is highly developed in and of itself, the control circuitry has been simplified and is shown only for a single pair of servo mechanisms M1, M2. It is to be understood that the master slave servo mechanisms for the two tool carriers 26, 46 are of a similar character.

Referring to FIG. 2, the tool assembly 28 shown thereby comprises a housing serving to mount the optical stylus 30 for rotation about its own axis, which axis is a zenith axis and is perpendicular to the plane of the support panel 20. A small electric motor 140 may be housed within the tool assembly 28. In FIG. 2 such a motor 140 is shown to include a small pulley 142 attached to its drive shaft, and a small drive belt 144 interconnecting the pulley 142 and a grooved intermediate portion 146 of the rotatable optical stylus 30. Electric motor 140 may be one of a pair of master-slave synchro-servo mechanisms for connecting together the optical stylus 30 and a rotatable stylus forming a part of the tool assembly 52. FIG. 4A shows such a stylus in the form of an electrical resistance wire type carving tool 56. This tool 56 is shown to have an outer casing 148 and a rotatable tool element 150, including a resistance wire 152, depending below the casing 148. A small electrical motor 154 is shown housed within the casing 148. Electric motor 154 may be the second master-slave synchro-servo mechanism which is paired with servo mechanism 140.

FIG. 4 shows in detail the vertically adjustable tool holder 54 for the tool 56, or a substitute therefor. Tool holder 54 is shown to comprise a tubular body 156 which projects vertically through the tool assembly housing. The axis of tube body 156 is a zenith axis and it is perpendicular to the plane of the opening 48. The upper end of tool 56 (or any replacement tool) slips into the lower end portion 158 of tube 156, and a clamp screw 160 serves to clamp the tool 56 in place. An elongated rack 162 is secured to the outer surface of tube 156. A small gear 164 within the tool assembly housing meshes with the rack 162. A small electric motor 166 serves to drive the gear 164, for in that manner driving the tube 156, and the tool 56 supported thereby, either upwardly or downwardly relative to the model block 168.

FIG. 7 shows an alternate form of tool assembly for use at table 10 in place of tool assembly 28. It comprises a tool mount 28' which is interchangeable with tool mount 28. Tool mount 28' includes a clamp section 170 for holding a tool adapter 172. Tool adapted 172 in turn holds a selected one of a plurality of interchangeable tools, including a pencil tool 174, a scribing tool 176 (FIG. 8) and an inking tool 178 (FIG. 9). Preferably the tool adapter 172 includes an upper portion which houses a linear solenoid motor 180. This solenoid is provided so that an electrical signal can be used for lifting the pencil, inking or scribing tool off of the paper during certain movements of the tool. Since solenoid mechanisms of this type are generally well known, the solenoid mechanisms of this type are generally well known, the solenoid mechanism is only generally indicated at 180 in FIG. 7. However, it is to be understood that when energized such mechanism serves to lift the tool point up off the paper or other surface on which it is caused to ride.

FIGS. 10, 11 and 12 show routing, scribing and tracing tools which are interchangeably mounted within support tube 156 in place of the resistance heating element carving tool 56. The routing tool 182 may include an electric motor in its interior for driving a chuck 188 which holds a suitable rotary routing tool 190. The scribing tool 184 is shown to merely include a pointed lower end member 192. The tracing wheel tool is shown to comprise a small wheel 194 at its lower end.

Each of the tools mountable on either tool carrier 26 or tool carrier 50 may be properly termed a "stylus," and each may be said to be adapted for following a two dimensional "linear" path.

Referring now to FIGS. 13 and 14, the support frame assembly 34 for the model or model material 168 is shown to comprise an outer frame part 196 and an inner frame part or platen 198. The outer frame part 196 is pivotally mounted for pivotal movement about a horizontal axis 199. The inner frame part 198 is located in the hollow interior of frame part 196 and is mounted for pivotal movement about an axis 200 which is perpendicular to axis 199 and lies within the general plane of the outer frame part 196. Indicator dials 202 and 204 may be provided for indicating the angle of inclination of the respective frame parts 196 and 198. Screw clamps or the like may be provided at the pivot axes, so that the operator may merely loosen a knob then manually move a frame part into an attitude of his choosing. Or, the positions of the frame parts 196, 198 may be determined by electrical motors 204 and 206, and by control means for remotely operating the motors 204, 206. The control means may be a part of the computerized circuitry briefly described above in connection with FIG. 6.

Inner frame part 196 is shown to include a pair of parallel T-grooves 208 for receiving a block or clamp 210. FIG. 14 shows each block 210 as including a lower base part 212 which rides within its groove 208, an upper portion 214 which projects above the upper surface of frame 198, and carries a spike 216 which enters into the model or model material 168, and a threaded vertical opening 218 for receiving a clamp screw (not shown).

In FIG. 1 the mechanism of the present invention is shown being used for milling a topographical model. The optical stylus 30 is moved by the operator along a given elevation line on the map 22. As he moves the stylus 30 linearly he also rotates it so that the indicator arrow 220 (FIG. 3) remains substantially perpendicular to the line he is tracing. Rotational movement of stylus 30 causes a corresponding rotational movement of the resistance wire milling 256 since the synchro--servo mechanisms 140, 154 are interconnected by master-slave circuitry. After he has finished milling a given elevation, the operator manipulates a control button or dial on his control console 222 for the purpose of energizing motor 166 to cause vertical movement of support tube 158, and the tool 56 carried thereby, the proper interval between elevation lines. Then the next elevation is milled on the model block 168. The control panel 222, which is merely symbolically shown by a plurality of buttons, may include read off means calibrated in terms of scale, so that the operator need only set his control to the scale being used and then make a further setting for the interval between elevation lines, so that each vertical movement of tool 156 can be effected by the advancing of a switch or the pushing of a button.

It is contemplated that the sideways back-and-forth travel of the support bar, the back-and-forth travel of the tool carrier 50, the vertical travel of the tool support tube 158, and the rotational travel of the tool 56, may all be controlled by the information storage and retrieval mechanism, (e.g., by a programed computer). Also, it is contemplated that the inner and outer frame parts 196, 198 may sometimes also be controlled by the programed computer, with the movements of the frame parts 196, 198 being coordinated with the other movements such that the model is milled in a true form, rather than as a series of step like cuts.

What is claimed is:

1. In combination:

a support frame for a three dimensional object, an upper frame comprising interconnected side members defining an interior opening, means supporting said upper frame in a position elevated above said support frame, an elongated support bar, means mounting said support bar on said upper frame for back-and-forth sideways movement across said opening relative to said support frame and any three dimensional object thereon, a tool carrier, means mounting said tool carrier on said support bar for back-and-forth movement therealong, and tool means on said carrier, for following a generally linear path on the three dimensional object;

electric motor means for moving said support bar back-and-forth sideways across said opening;

electric motor means for moving said tool carrier back-and-forth along the support bar; and means for adjusting the tool in zenith throughout a range of positions between a position relatively near the upper frame and a position relatively near the support frame for the three dimensional object.

2. The combination of claim 1, further including means mounting said tool means for rotation about its axis, which axis extends substantially perpendicular to the plane of travel of the support bar.

3. The combination of claim 1, further comprising a pair of elongated guide rods for said support bar, each guide rod being positioned near a separate end of the bar, and extending perpendicular to said bar and in parallelism with the guide rod at the opposite end of the bar, guide bearing means surrounding each guide rod, means connecting said guide bearing means to the adjoining end of the support bar, an elongated line member in tension extending generally longitudinally of at least one of said guide bars, and wherein the electric motor means for moving said support bar includes a small electric motor carried by the support bar having a rotary shaft, and a grooved wheel on said shaft which engages said elongated line member in tension, such that there is a driving contact between said grooved wheel and the elongated line member in tension.

4. The combination of claim 1, comprising a table having side support means, a generally horizontal frame assembly mounted by said side support means and held thereby at a position substantially intermediate the height of said table, which frame assembly constitutes the said support frame for a three dimensional object, wherein said upper frame is mounted atop said side support means and comprises four side portions, each of which is connected to its adjoining two side portions by a substantially right angle corner.

5. The combination of claim 4, wherein said frame assembly comprises an outer frame part pivotally mounted on said side support means for pivotal movement about a generally horizontal axis, and an inner frame part mounted on said outer frame part for pivotal movement about a second axis which is perpendicular to the first axis and is within the plane of the outer frame part.

6. The combination of claim 5, further comprising means for adjustably supporting said frame assembly between said side support means, so that the height of said frame assembly and the vertical spacing of said first axis to said interiorly open frame can be adjusted.

7. The combination of claim 1, further comprising an information storage and retrieval mechanism and means for converting stored information in said mechanism to signals for controlling at least some of said electric motor means.

* * * * *